United States Patent
Lee (10) Patent No.: US 8,890,358 B2
(45) Date of Patent: Nov. 18, 2014

(54) EMERGENCY GENERATOR POWER SYSTEM WITH RESERVED FIRE PROTECTION POWER

(76) Inventor: Won Kang Lee, Seoul (KR)

(*) Notice: Subject to any disclaimer, the term of this patent is extended or adjusted under 35 U.S.C. 154(b) by 742 days.

(21) Appl. No.: 13/124,392
(22) PCT Filed: Oct. 14, 2009
(86) PCT No.: PCT/KR2009/005919
§ 371 (c)(1), (2), (4) Date: Apr. 14, 2011
(87) PCT Pub. No.: WO2010/044610
PCT Pub. Date: Apr. 22, 2010

(65) Prior Publication Data
US 2011/0198928 A1 Aug. 18, 2011

(30) Foreign Application Priority Data

Oct. 14, 2008 (KR) .................. 10-2008-0100844
Oct. 14, 2009 (KR) .................. 10-2009-0097751

(51) Int. Cl.
H02J 3/14 (2006.01)
H02J 9/08 (2006.01)
(52) U.S. Cl.
CPC .................................. *H02J 9/08* (2013.01)
USPC .......................................................... 307/39
(58) Field of Classification Search
USPC .......................................................... 307/39
See application file for complete search history.

(56) References Cited

U.S. PATENT DOCUMENTS

| | | | |
|---|---|---|---|
| 5,764,463 A | 6/1998 | Arvidson et al. | |
| 6,198,176 B1 * | 3/2001 | Gillette | 307/64 |
| 2002/0024782 A1 * | 2/2002 | Kim et al. | 361/42 |
| 2007/0090940 A1 * | 4/2007 | Roark et al. | 340/506 |

FOREIGN PATENT DOCUMENTS

| | | |
|---|---|---|
| CN | 2829185 | 10/2006 |
| DE | 3230047 | 2/1984 |
| JP | 09-205721 | 8/1997 |
| JP | 2000-069676 | 3/2000 |
| JP | 2005-020879 | 1/2005 |
| JP | 2008-113500 | 5/2008 |
| JP | 2008-245454 | 10/2008 |
| JP | 2009-219247 | 9/2009 |

OTHER PUBLICATIONS

International Search Report for PCT/KR2009/005919 Mailed Nov. 24, 2010.

* cited by examiner

*Primary Examiner* — Jared Fureman
*Assistant Examiner* — Joseph Inge
(74) *Attorney, Agent, or Firm* — AKC Patents LLC; Aliki K. Collins (57) ABSTRACT

An emergency generator power system with reserved fire protection power includes a generator engine and a generator body, a main power circuit breaker, a control panel, and a circuit breaker for fire protection systems and a circuit breaker for other emergencies.

The generator power system also includes a measuring instrument and a control instrument. The measuring system measures a power load change on a main power line passing via the main power circuit breaker. The control instrument is connected to the measuring instrument at an input side thereof and to the circuit breaker for other emergencies at an output side thereof. When the value of the power load change reaches a predetermined value, the circuit breaker for other emergencies is primarily broken, thereby keeping the main power circuit breaker from being broken before the breaking of the circuit breaker for other emergencies.

9 Claims, 11 Drawing Sheets

EMERGENCY GENERATOR POWER SYSTEM WITH RESERVED FIRE PROTECTION POWER

RELATED APPLICATIONS

This application is a 371 application of International Application No. PCT/KR2009/005919, filed Oct. 14, 2009, which in turn claims priority from Korean Patent Application Nos. 10-2009-0097751, filed Oct. 14, 2009, and 10-2008-0100844, filed Oct. 14, 2008, each of which is incorporated herein by reference in its entirety.

TECHNICAL FIELD

The present invention relates to an emergency generator power system with reserved fire protection power that has a characteristic of automatically supplying fire protection power when a fire breaks out, and more particularly, to an emergency generator power system for fire protection systems and other emergencies having an automatic switching function to fire protection that is selected based on the capacity of the larger of power load for fire protection systems and power load for other emergencies, while being used for fire protection systems and other emergencies and, hereby reducing installation costs, and that supplies the power load for other emergencies at the time of normal power interruption, at the same time supplies the power load for fire protection systems and the power load for other emergencies at an initial step at the time of power interruption during the generation of a fire, and gradually increases the power load for fire protection systems as the fire is developed, such that if the power load for fire protection systems almost reaches a set value near a rated capacity of the generator, the supply of the power load for other emergencies is stopped, which safely supplies the power load for fire protection systems during the fire, thereby providing high economical efficiencies and safety.

First of all, the terms used in the detailed description of the present invention will be explained.

"Generator power system with reserved fire protection power" defines an emergency generator power system including respective circuit breaker used to supply a power load for other emergencies as an emergency load from which a power load for fire protection systems is not contained and the power load for fire protection systems for fire protection facilities. The above-mentioned private generator is automatically operated in a case where a fire breaks out during power interruption or where power is interrupted during fire to supply the power load for fire protection systems and the power load for other emergencies with emergency power source, to stop the variations of the power load consumed by the fire broken out or the power load for other emergencies on set conditions, such that the power for fire protection is continuously supplied even though the generator reaches its overload conditions. Hereinafter, when repeatedly and shortly referring, the term "generator power system with reserved fire protection power" can be used. Further, fire protection power reserving type in view of the power load for fire protection systems is similarly referred to as a fire protection power-automatic selecting type, a fire protection power-preserving type, a fire protection power-switching type, a fire protection power-protecting type, a fire protection power-maintaining type, a fire protection power-switching type, a fire protection power-transferring type, a fire protection power-transforming type, and a fire protection power-preferring type power generator, and on the other hand, the fire protection power reserving type in view of the power load for other emergencies is similarly referred to as an automatic controlling type, an automatic limiting type, and an automatic breaking type for the power load for other emergencies or the load except the power load for fire protection systems.

"Power load for fire protection systems" is a power load needed for the fire extinguishing facilities installed on a building, facility and the like so as to perform the generation of fire alarming, fire fighting, and life escaping in accordance with the fire protection-related laws and the requirements for fire safety. The power load for fire protection systems largely includes an emergency power load in accordance with construction laws and air laws "For fire protection systems" is used for power lines or wiring devices for power load for fire protection systems used in fire.

"Power load for other emergencies" is an general emergency power load except the power load for fire protection systems according to the fire protection-related laws, and the power load for other emergencies may be limited only to the emergency power load for business conveniences for maintaining functions of buildings except the power load defined under the laws including fire protection laws, construction laws, and air laws.

"For other emergencies" is used for power lines or wiring devices power for power load for other emergencies.

"Main power" is the generation power of the emergency generator power system, and in case of the generator for fire protection systems and other emergencies, the main power is obtained by adding power interruption power and fire protection power.

"The fire protection power" is the emergency power supplied to satisfy the power load of the fire extinguishing facilities activated upon the generation of fire or a test operation.

"A main power line" is the line extending from the power output of the emergency generator power system to the line before branching to a circuit breaker for fire protection systems and a circuit breaker for other via a main power circuit breaker. In case of the high voltage emergency power generator, a drawing circuit breaker and a transformer are disposed between the emergency generator power system and the main power circuit breaker, and at this time, the main power line includes the line via the drawing circuit breaker and the transformer. However, in case of the parallel running generator, the main power line is extended from the line on which the output sides of the respective generators gather to the line via the main power circuit breaker.

"Control line" is the line to which control power is supplied for operating and stopping the emergency generator power system and the fire extinguishing facilities and for controlling the safety devices like circuit breakers.

"A measuring instrument" is a component for measuring the overload conditions due to the generation of fire, when emergency power is supplied by the activation of the emergency generator power system at the state of power interruption upon generation of fire or at the state of generation of fire upon power interruption. The input side of the measuring instrument is connected to lines of power equipment, and the output side thereof is connected to a control instrument or a circuit breaker for other emergencies, and includes a current transformer (CT), a power transformer (PT), a digital total power control system or the like.

"A control instrument" is a single or a plurality of control devices or control lines disposed in parallel or serial relation to each other on the circuit breaker for other emergencies, which receive the input from the measuring instrument, and generate a single output or a plurality of outputs at a set value to provide respective contacts to the circuit breaker for other emergencies, and supply control power to a trip to open the trip terminal. The control instrument includes an OCR or OPR mounted internally or externally in/from the main power circuit breaker, and it is used with existing embedded products in an operation-controlling controller of an emergency generator power system or external products such as control panel installed separately. If the contact capacity of the control instrument is smaller than the capacity (about 10 A) needed for controlling the circuit breaker for other emergencies, an auxiliary control instrument like a control relay is provided, and in this case, the control instrument includes the control instruments. The control instrument includes the following components or parts. Digital integrating power controller, intelligent communication & measuring devices, digital multi power meters, intelligent measuring & protection devices for feeder, maximum power load controller, generator's controller, a programmable logic controller (PLC), a microcomputer (MICOM), a central processing unit (CPU), a personal computer (PC), a direct digital controller (DDC), a distributed control system (DCS), a distributed operated console (DOC), a supervisory control and data acquisition (SCADA), an application specific integrated circuit (ASIC), an application specific instruction processor (ASIP), a meter relay, a watt meter, a watt-hour meter, a var meter, a var-hour meter, an ammeter, a digital relay, an inductive relay, a thermal relay, an over current relay (OCR), an over power relay (OPR), an electronic over current relay (EOCR), a control relay, other relays, and auxiliary contacts of the control instrument.

"The main power circuit breaker" is a power circuit breaker installed on the main power line, for protecting the emergency generator power system and the main power line systems, in case of a single operating way. On the other hand, in case of a parallel operating way, the main power circuit breaker is installed on the main power line to which the lines at the rear ends of the circuit breakers disposed on the respective emergency generator power systems are connected.

"The circuit breaker for fire protection systems" is installed to protect the power line systems for fire protection at the interior or exterior of the control panel of the generator, and includes a single or a plurality of circuit breakers on the power line for fire protection branched from the main power line of the generator. Further, the circuit breaker for fire protection systems includes the branch circuit breakers for fire protection systems at the lower end thereof and the molded case circuit breaker and switch of fire extinguishing equipment. The ACB and MCCB having a circuit-breaking function are used.

"The circuit breaker for other emergencies" is installed to protect the power line systems for other emergencies at the interior or exterior of the control panel of the generator, and includes a single or a plurality of circuit breakers on the power line for other emergencies branched from the main power line of the generator. Further, the circuit breaker for power interruption includes the branched circuit breaker for other emergencies at the lower end of the circuit breaker for other emergencies and the molded case circuit breaker and switch for other emergencies equipment. Generally, the ACB and MCCB are used for the circuit breaker for power interruption, and the circuit breaker for power interruption includes a trip device, or the trip device and a trip alarming device, or an embedded auxiliary contact.

BACKGROUND ART

To protect people's life and property from fires when fire breaks out, escaping facilities, alarming systems, fire extinguishing systems and fire extinguishing activity systems, as the fire protection facilities built in a building or facility being in a danger of fire, are installed by their needs or should be installed necessarily in accordance with the laws related to fire protection. Emergency power except normal power is separately provided when power interruption happens and emergency generator power system is mainly used.

In addition to the power load for fire protection systems, an emergency power load for other emergencies is prepared, and so as to provide conveniences to the residents in the building when the power interruption of normal power happens, in this case, a part or all of the load of normal power is supplied as emergency power.

Commonly, the capacities of the loads for fire protection systems and other emergencies are almost similar to each other.

By the way, a method of breaking the loads for other emergencies at the same time to immediately protect the fire protection power when fire breaks out is most effective in view of fire protection, since the fire extinguishing facilities are activated, but a method of supplying the power loads for fire protection systems and other emergencies at the same time at the initial step of the generation of fire and stopping the supply of the power load for other emergencies as the loads are increased by the lapse of time is keenly needed in view of the fire protection and the escaping of the residents.

Typically, although having two effective ways and problems, installation of existing private generators is made by one of the following ways widely used.

Figure 1:
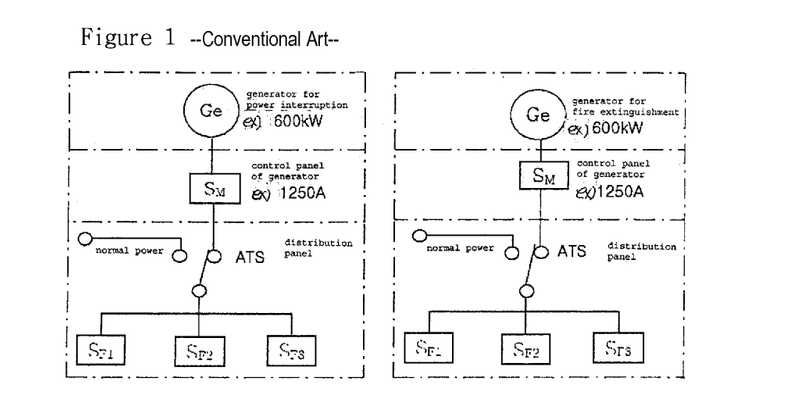
FIG. 1 is a schematic circuit diagram showing a generator for fire protection and an emergency generator for other emergencies installed independently of each other according to conventional practices, each of the generators supplying the respective required loads.

As in illustrated FIG. 1, as a first way, a generator for fire protection systems and a generator for other emergencies are installed independently of each other. This ensures more reliable stability, but causes the number of generators and the construction area to be undesirably increased. So, the installation of the two generators is difficult to be adopted well.

Figure 2:
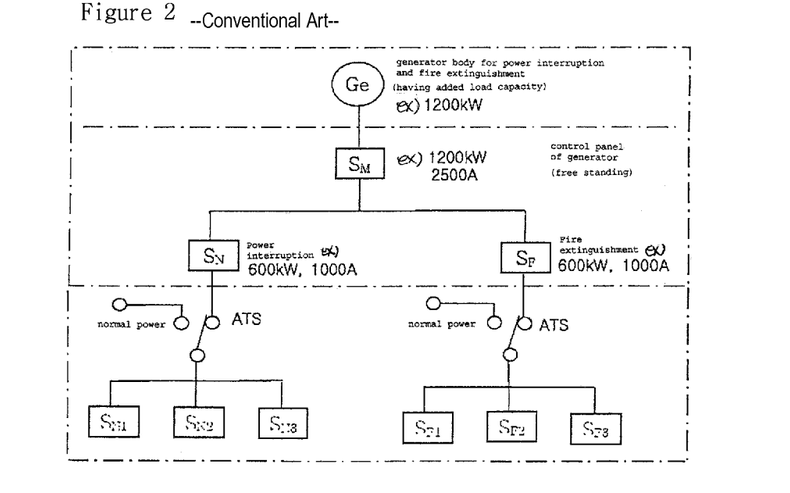
FIG. 2 is a schematic circuit diagram showing a single emergency generator system which is capable of supplying emergency power at the time of power interruption according to conventional practices.

As in illustrated FIG. 2, as a second way, a generator is installed having rated output capacity based on a capacity obtained by adding a power load for fire protection systems and a power load for other emergencies.

This provides the capacity being two times as large as a single load, thereby ensuring reliable stability in view of the capacity, but it is disadvantageous in view of construction costs. Since this way is more advantageous than the first way, it is adopted in some cases.

Figure 3:
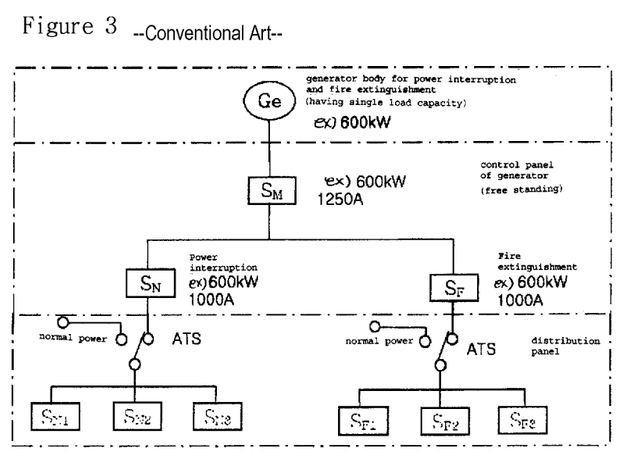
FIG. 3 is a schematic circuit diagram showing an emergency generator system having a single capacity which is capable of supplying emergency power at the time of power interruption according to conventional practices.

As in illustrated FIG. 3, as a third way, a generator is installed by selecting a larger load in the power load for fire protection systems and the power load for other emergencies for rated output capacity based on the selected single power load and supplying the power load for fire protection systems and the power load for other emergencies through the selected single load capacity.

This is based upon the concept where the power load for other emergencies is supplied upon the power interruption and the power load for fire protection systems upon the generation of fire. In real states, however, the power load for other emergencies is used at the time of power interruption, and the power load for fire protection systems and the power load for other emergencies are used at the same time when the fire breaks out during power interruption or when the power interruption happens during fire, such that the capacity of the generator is over to activate the power breaker for protecting overload of generator, which stops the supply of the emergency power, thereby providing many dangers in those states.

Accordingly, the present invention has a significance in that it can economically eliminate safety-threatening elements and therefore satisfy the provisions by relevant law and demanders by realizing reasonable technique which can solve the above-mentioned problems.

Figure 4:
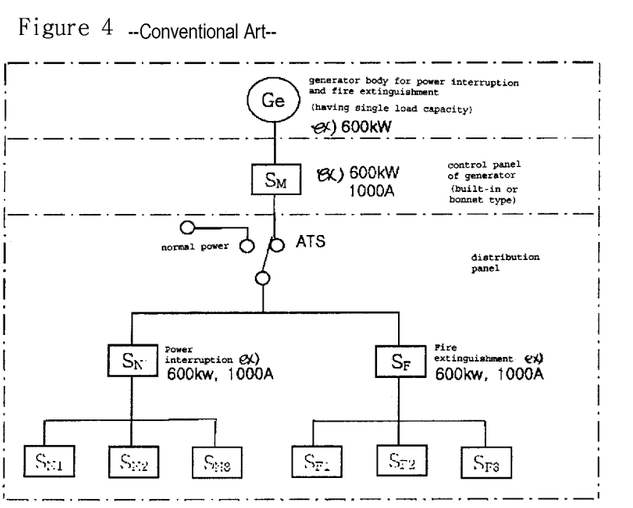
FIG. 4 is a schematic circuit diagram showing another emergency generator system having a single capacity which is capable of supplying emergency power at the time of power interruption according to conventional practices.

FIG. 4 shows another emergency generator power system having a single capacity which is capable of supplying emergency power at the time of power interruption according to conventional practices. The configuration of the lines is the same as in FIG. 3, but in case of installing a built-in emergency generator power system or in case of installing a bonnet type power generator which is called disaster prevention type generator, an ATS is installed on a main power line at the lower end of a main power circuit breaker, and a circuit breaker for fire protection systems and a circuit breaker for other emergencies are branched from the lower end of the ATS. The danger of the loss of the effectiveness of the installation of the emergency generator power system for fire protection systems according to the over capacity of the generator is caused in the same manner as FIG. 3.

Figure 5:
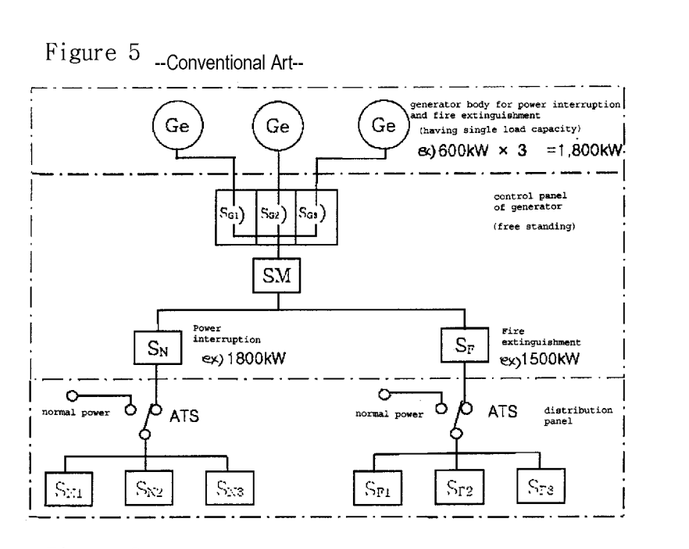
FIG. 5 is a schematic circuit diagram showing yet another emergency generator system having a single capacity which is capable of supplying emergency power at the time of power interruption according to conventional practices.

FIG. 5 shows yet another emergency generator power system having a single capacity which is capable of supplying emergency power at the time of power interruption according to conventional practices. The configuration of the lines is the same as in FIG. 3, but in this configuration, the emergency generator power systems are installed in parallel with each other. A main power circuit breaker is installed on a main power line to which the lines via the circuit breakers of the respective generators are connected, and a circuit breaker for fire protection systems and a circuit breaker for other emergencies are branched from the lower end of the main power circuit breaker. The danger of the loss of the effectiveness of the installation of the emergency generator power system for fire protection systems according to the over capacity of the generator is caused in the same manner as FIG. 3.

Figure 6:
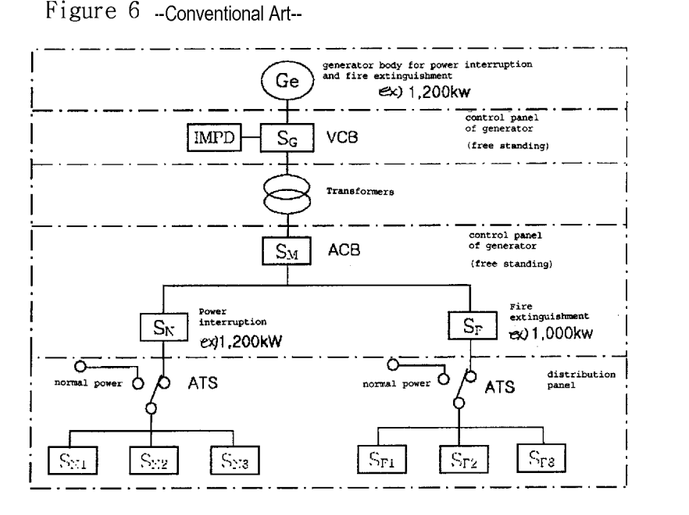
FIG. 6 is a schematic circuit diagram showing still another emergency generator system having a single capacity which is capable of supplying emergency power at the time of power interruption according to conventional practices.

FIG. 6 shows still another emergency generator power system having a single capacity which is capable of supplying emergency power at the time of power interruption according to conventional practices.

The system is similar to as in FIG. 3, but in this configuration, a high voltage emergency generator power system is installed. A VCB as a high voltage circuit breaker and a transformer are installed between the generator body and the main power circuit breaker as shown in FIG. 3, and a circuit breaker for fire protection systems and a circuit breaker for other emergencies are branched from the lower end of the transformer. The danger of the loss of the effectiveness of the installation of the emergency generator power system for fire protection systems according to the over capacity of the generator is caused in the same manner as FIG. 3.

In case of installing the high voltage emergency generator power system as shown in FIGS. 4 and 5, the high voltage power is directly connected to the loads, but generally, a low voltage load is wholly or partially contained. If power is supplied to the low voltage load, the high voltage vacuum circuit breaker and the transformer are installed between the circuit breaker of the generator and the main power circuit breaker. In case where the output capacity of the generator on a basis of the single load capacity for fire protection systems or other emergencies is selected in the generators as shown in FIGS. 3 to 6, overload is caused, such that the main power circuit breaker of the power generator is opened at the time of power interruption and fire, thereby causing fail of supplying effective emergency power to fire extinguishing facilities, thus failing to substantially satisfy the provisions that effective emergency generator power system should be installed in fire extinguishing facilities by a law. and causing dangers by the fire, and therefore such problems need to be solved.

DISCLOSURE

Technical Problem

Accordingly, the present invention has been made in view of the above-mentioned problems occurring in the prior art, and it is an object of the present invention to provide an emergency generator power system having characteristics that fire safety for building in which the power generator is to be installed is ensured, which safety is required in view of fire protection safety, and the provisions are substantially satisfied about emergency power source which should be installed in the fire extinguishing facilities by a law and at the same time economy of minimum installation cost is also attained in a condition allowing for installation of emergency generator power system of rated output capacity on a basis of a single power load of the larger of power load for fire protection systems and power load for other emergencies.

Technical Solution

To achieve the above objects, according to the present invention, there is provided an emergency generator power system with reserved fire protection power for fire protection systems and other emergencies, this emergency generator power system being used during stop of supplying of normal power and having a main power circuit breaker and at least one circuit breaker for fire protection systems and circuit breaker for other emergencies branched from the lower end of the main power circuit breaker, the emergency generator power system comprising:
a measuring instrument adapted to measure the state of increase of a power load on a main power line; and
a control instrument connected to the measuring instrument at an input side thereof and connected to the circuit breaker for other emergencies at an output side thereof, such that when the value of the variations of the power load inputted from the measuring instrument reaches a predetermined set value, the circuit breaker for other emergencies is primarily broken, thereby keeping the main power circuit breaker from being broken before the breaking of the circuit breaker for other emergencies, wherein an emergency power is supplied to a power load for fire protection systems and a power load for other emergencies at the same time until the emergency generator power systems reaches an overload state during fire, and finally the supply of the fire protection power is primarily kept, thus the emergency power is continuously supplied to the power load for fire protection systems.

According to one aspect of the present invention,
the emergency generator power system further comprising:
a plurality of circuit breakers for other emergencies constituting the present invention; and
a control instrument which is composed of one or more components such that when a value of the power load sequentially set in plurality is reached, the plurality of the circuit breakers for other emergencies are sequentially broken respectively, thereby keeping the main power circuit breaker from being broken before the breaking of all of the branch circuit breakers for other emergencies.

According to another aspect of the present invention,
the control instrument constituting the present invention comprises auxiliary control instrument for supplementing the capacity.

According to yet another aspect of the present invention, any one of auto load breaker and auto load transfer switch is applied instead of the circuit breaker for other emergencies constituting the present invention.

According to yet another aspect of the present invention, the measuring instrument and the control instrument constituting the present invention are applied as devices installed in the main power circuit breaker.

According to yet another aspect of the present invention, the emergency generator power system further comprises a display device adapted to be connected with the control instrument constituting the present invention for displaying the operation state of reserve of fire protection power on a display lamp, a display window, or a screen with one or more of characters, symbols, and patterns at a control panel of the generator or controlled remotely.

According to yet another aspect of the present invention, the emergency generator power system further comprises a control switch connected to the control instrument and the circuit breaker for other emergencies constituting the present invention so as to performing a control test for optionally checking the operation state of reserve of fire protection power and a returning test to an original state.

According to yet another aspect of the present invention, the measuring instrument constituting the present invention comprises one of a current transformer (CT) and a power transformer (PT).

According to yet another aspect of the present invention, the control instrument constituting the present invention comprises one of a digital integrating power controller, an intelligent communication & measuring device, a digital multi power meter, an intelligent measuring & protection device for feeder, a maximum power load controller, a generator's controller, a programmable logic controller (PLC), a microcomputer (MICOM), a central processing unit (CPU), a personal computer (PC), a direct digital controller (DDC), a distributed control system (DCS), a distributed operated console (DOC), a supervisory control and data acquisition (SCADA), an application specific integrated circuit (ASIC), an application specific instruction processor (ASIP), meter relays, watt meters, watt hour meters, var meters, var hour meters, ammeters, digital relays, inductive relays, thermal relays, overcurrent relay (OCR), overpower relay (OPR), electronic overcurrent relay (EOCR), and control relays.

Advantageous Effects

As described above, according to the emergency generator power system with reserved fire protection power, this emergency generator power system can be used as an emergency generator power system having a capacity on a basis of either one of the power load for fire protection systems and the power load for other, the power load for other emergencies is supplied with emergency power at the time of power interruption, the power load for fire protection systems and the power load for other emergencies are simultaneously supplied with the emergency power at an initial step where power interruption breaks out during fire, and in a case that fire develops with the elapse of time, if load value set near the rated load or emergency load of the emergency generator power system is reached as the power load for fire protection systems is increased, the supply of the power load for other emergencies is stopped sequentially or in a lump, and therefore the risk is solved by the root with the emergency generator power systems itself that operation is stopped due to overload of emergency generator power system at fire as the emergency power is continuously supplied to the power load for fire protection systems, and unreasonableness is also solved by the root with the emergency generator power systems itself that the emergency power can not be automatically supplied to one of the power loads at the time of stopping of power supply due to interruption of the power load for other emergencies by operation for emergency fire warning or check test of the fire protection facilities, thereby providing conveniences in their activities to the residents in the building at the initial step of the fire, providing safe escaping results to them, and continuously supplying the fire protection power, thus achieving good conveniences, economy, safety and legal requirements at the same time.

BEST MODE

An explanation on the emergency generator power systems with reserved fire protection power for fire protection systems and other emergencies according to the present invention will be given in detail with reference to the attached drawings.

Figure 7:
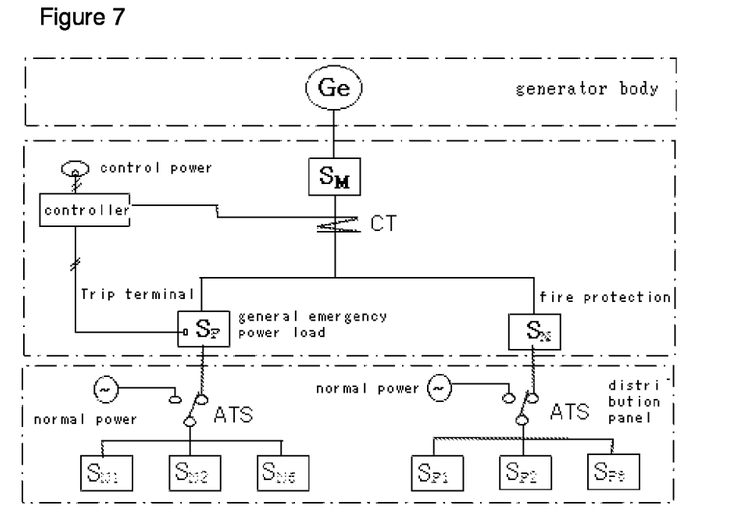
FIGS. 7 to 22 are schematic circuit diagrams showing an emergency generator power system with reserved fire protection power according to the present invention.

FIG. 7 is a view illustrating the emergency generator power systems with reserved fire protection power for fire protection systems and other emergencies according to the present invention.

FIGS. 7 to 22 are schematic circuit diagrams showing different examples of the emergency generator power systems with reserved fire protection power. The basis drawing is FIG. 3, and the basis drawings at the time of the construction of the present invention are FIGS. 4, 5 and 6.

In the preferred embodiments of the present invention, the repetition of the explanations on the same reference numerals as each other in the drawings will be avoided.

Referring to FIGS. 7 to 22, under the condition where the emergency generator power systems with reserved fire protection power is used for fire protection systems and other emergencies, the emergency generator power system having an automatic switching function to fire protection according to the present invention includes a main power circuit breaker (in case of a parallel operating system, a main power circuit breaker installed at the lower end of a generator breaker), a circuit breaker for fire protection systems and a circuit breaker for other branched from the lower end of the main power circuit breaker. An automatic transferring switch (ATS), which automatically transfers power by the operation of a low voltage relay at the time of power interruption of normal power to an emergency power line of the generator, is installed at front ends or rear ends of the circuit breaker for fire protection systems and the circuit breaker for other emergencies, and in a state where an emergency power is supplied to the loads branched via a single or a plurality of branch circuit breakers for fire protection systems and a single or a plurality of branch circuit breakers for other emergencies branched at the lower end of the automatic transferring switch, load is gradually increased due to running of at the time of the power interruption and the generation of fire, and the branch circuit breakers for other emergencies are primarily broken in order to continuously supply more urgent power load for fire protection systems, and circuit breakers for main power are not opened before circuit breakers for other emergencies are interrupted, therefore the fire is extinguished by continuous operation of fire-extinguishing facilities, accordingly the emergency generator power systems with reserved fire protection power can simultaneously ensure fire protection safety and economy.

The construction of the equipment related to the present invention or the line construction thereof has a relation with the control panel of the power generator, and in case of the free standing control panel having a housing space therein, the control instrument and the circuit breaker for other emergencies are housed in the interior of the control panel and connected thereinto. However, even if the free standing control panel is provided in a state where the control instrument and the circuit breaker for other emergencies are exteriorly mounted on the distribution panel, or even in case of the built-in control panel and the bonnet control panel, the connecting terminals between the measuring instrument installed or connected to the generator and the control instrument installed on the distribution panel disposed on the outside of the control panel are provided in a connection terminal box of the control panel of the power generator, thereby constructing the control line through the connection on the site. Further, in case of the control instrument remotely controlled from the outside, the control of a short distance is effectively conducted by the control line, and the control of a long distance by a communication line. The control by the communication line is conducted wirely or wirelessly.

Referring to FIG. 7, there is provided a the emergency generator power systems with reserved fire protection power, the emergency generator power systems with reserved fire protection power being used as an emergency generator power system available during interruption of normal power and having a main power circuit breaker and a circuit breaker for fire protection systems and a circuit breaker for other branched from the lower end of the main power circuit breaker, the emergency generator power systems with reserved fire protection power for fire protection systems and other emergencies including: a measuring instrument adapted to measure the state of increase of load at the time of occurrence of fire on a main power line via the main power circuit breaker; and a control instrument connected to the measuring instrument at an input side thereof and connected to the circuit breaker for other emergencies at an output side thereof, such that when the value of the variations of the power load inputted from the measuring instrument reaches a predetermined set value, the circuit breaker for other emergencies is primarily broken, thereby keeping the main power circuit breaker from being broken before the breaking of the circuit breaker for other emergencies.

The power of the generator GE. is passed through the main power circuit breaker SM on the control panel and is branched at the lower end of the main power circuit breaker SM to the circuit breaker SF for fire protection systems and the circuit breaker SN for other emergencies. The respective lines are passed through the automatic transfer switch ATS installed on the distribution panel or the control panel on lines after main circuit breaker or circuit breaker for other emergencies for automatically switching the normal power to the emergency power at the time of power interruption and are then passed through and a single or a plurality of branch circuit breakers SF1, SF2 and SF3 for fire protection systems and a single or a plurality of branch circuit breakers SN1, SN2 and SN3 for other emergencies installed on the distribution panel, thereby supplying the emergency power to the respective loads. The emergency generator power system includes the measuring instrument installed on the main power line of the generator so as to measure the variations of the load thereon, and the control instrument connected at one end thereof to the measuring instrument and providing a contact to a trip terminal of the circuit breaker SN for other emergencies at the other end thereof. When the generator is operated, the load is measured through the measuring instrument, and if the current or power value on the main power line is high by the activation of the fire protection facilities upon the generation of fire, the control instrument is operated by a set load value lower than a load value by which the over current relay of the main power circuit breaker SM is operated and opened, thereby allowing the circuit breaker SN for other emergencies to be opened, such that at the state where the main power circuit breaker SM and the circuit breaker SF for fire protection are being in the connected state, the emergency fire extinguishing power is continuously supplied.

The control instrument is provided to add circuits to an existing generator controller, and alternatively, the control instrument mounted internally or externally on the control panel is separately provided, thereby ensuring the features of the emergency generator power systems with reserved fire protection power for fire protection systems and other emergencies, which is remotely controlled through communication of RS485 standard for example. In this case, the short distance is controlled by the construction of the control line, and the long distance is by the construction of LAN or the like.

Figure 8:
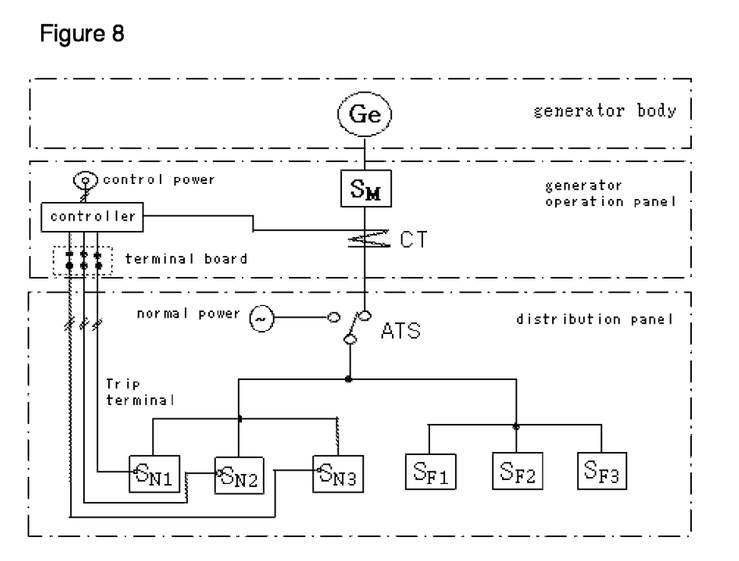

According to the present invention, most of fires are extinguished at their initial step by the fire extinguishing facilities, and therefore, the power load for fire protection systems and the power load for other emergencies are supplied all at the time of fire protection at the initial step of the fire and during fire, thereby providing conveniences to the residents of the building during that time, helping their escaping from fire, and safely supplying power load for fire protection systems for the fire extinguishing facilities with emergency power FIG. 8 shows the emergency generator power systems with reserved fire protection power according to another preferred embodiment of the present invention, which is almost similar to FIG. 7, except that the supply of the power load for other emergencies stops by means of a plurality of circuit breakers for other emergencies or the plurality of branch circuit breakers for other emergencies disposed at the lower end of the circuit breaker for other emergencies. This manner of operation being sequentially carried out at one or more values set at the control instrument by receiving load values measured at the measuring instrument has advantages that the plurality of branch circuit breakers for other emergencies is not broken at one time, but they are sequentially broken, which further extends the time of the supply of the power for other emergencies for the remaining power loads for other emergencies, thereby increasing degree of utilization.

Figure 9:
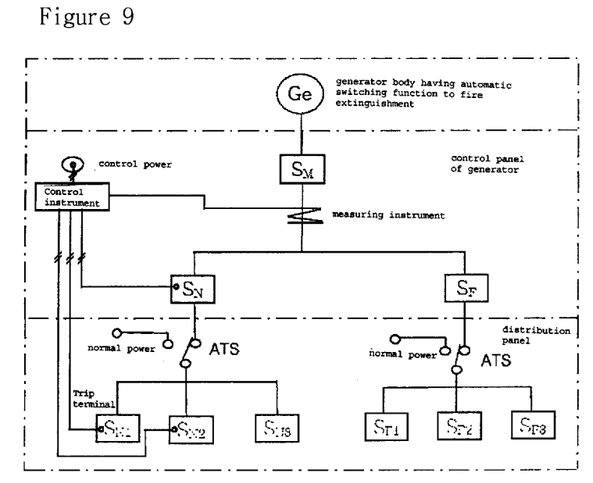

FIG. 9 shows the emergency generator power systems with reserved fire protection power according to yet another preferred embodiment of the present invention, which is almost similar to FIG. 7, except that the supply of the power load for other emergencies stops by means of the circuit breaker for other emergencies and a part of the plurality of branch circuit breakers for other emergencies disposed at the lower end of the circuit breaker for other emergencies. In the preferred embodiment of the present invention, advantageously, in case where the number of the branch circuit breakers for power interruption is large to cause the construction of the lines to be hard, the supply of major loads is primarily and selectively stopped through the part of the plurality of branch circuit breakers for other emergencies and finally stopped through the circuit breaker for other emergencies, which further extends the time of the supply of the power interruption power through the sequential stop of the power load for other emergencies.

Figure 10:
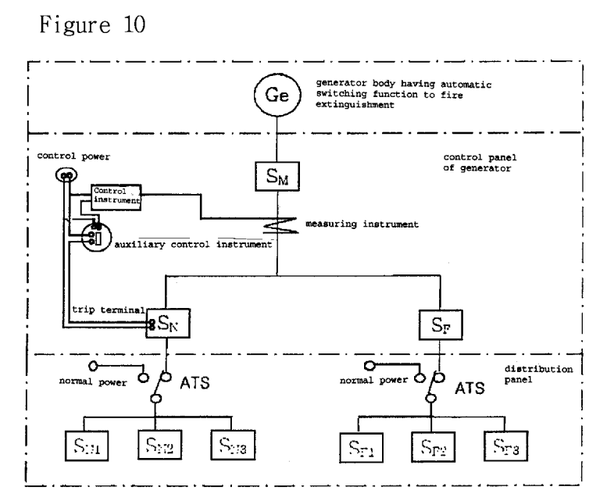

FIG. 10 shows the emergency generator power systems with reserved fire protection power according to still another preferred embodiment of the present invention, which is almost similar to FIG. 7. In the preferred embodiment of the present invention, advantageously, in case where the control instrument does not have a sufficient contact capacity, an auxiliary control instrument like a relay is adopted to improve safety or to provide an auxiliary function like additional displaying. The auxiliary control instrument is disposed inside or outside the control panel.

Figure 11:
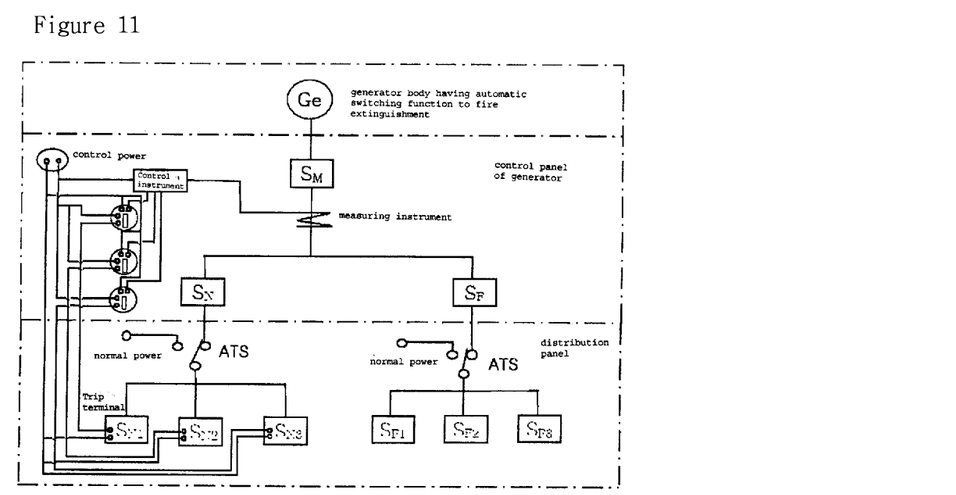

FIG. 11 shows the emergency generator power systems with reserved fire protection power according to still another preferred embodiment of the present invention, which is almost similar to FIG. 8. In the preferred embodiment of the present invention, advantageously, in case where the control instrument has a lacking contact capacity, a plurality of auxiliary control instruments like a relay is adopted to improve safety or to provide an auxiliary function like additional displaying. The auxiliary control instruments are disposed inside or outside the control panel.

Figure 12:
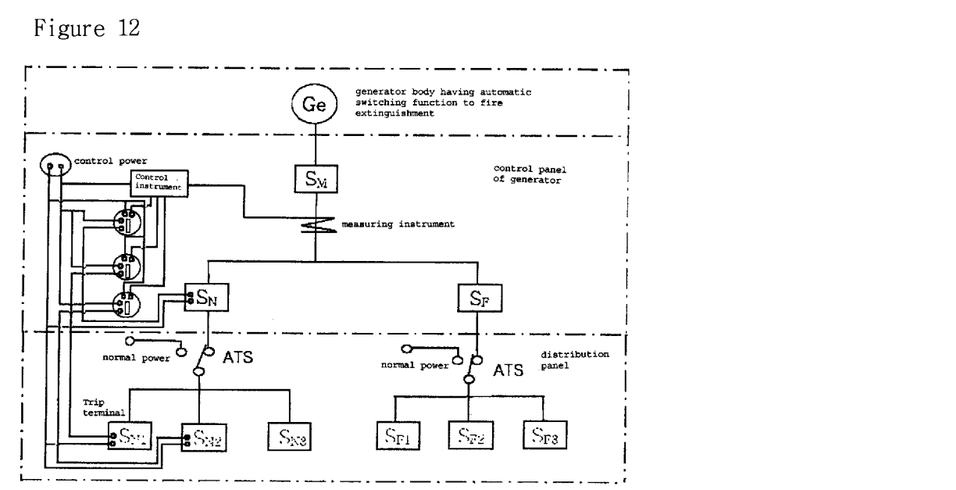

FIG. 12 shows the emergency generator power systems with reserved fire protection power according to yet still another preferred embodiment of the present invention, which is almost similar to FIG. 9. In the preferred embodiment of the present invention, advantageously, in case where the control instrument has a lacking contact capacity, a plurality of auxiliary control instruments like a relay is adopted to improve safety or to provide an auxiliary function like additional displaying. The auxiliary control instruments are disposed inside or outside the control panel.

Figure 13:
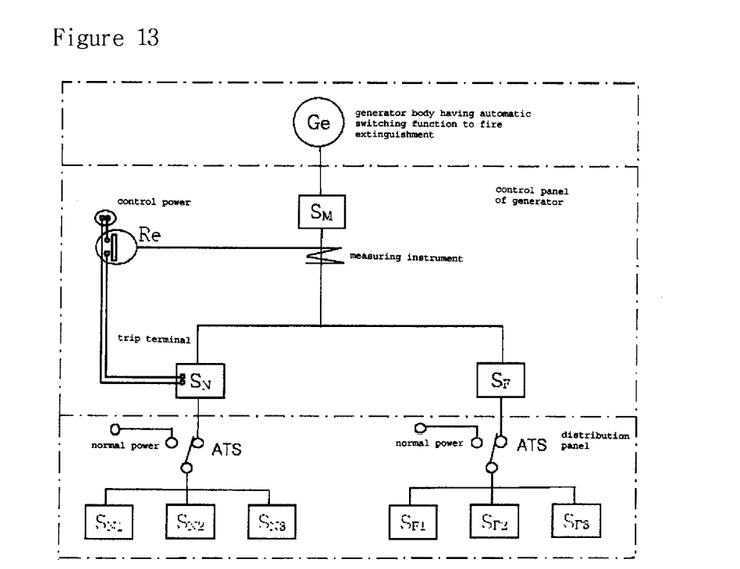

FIG. 13 shows the emergency generator power systems with reserved fire protection power according to still another preferred embodiment of the present invention, which is almost similar to FIG. 7, but the control instrument constitutes the emergency generator power systems with reserved fire protection power for fire protection systems and other emergencies using various kinds of relays like a digital relay. The installation of the generator is relatively simple and the generator is easy to be additionally applied to existing power generators as well as newly manufactured emergency generator power systems.

Figure 14:
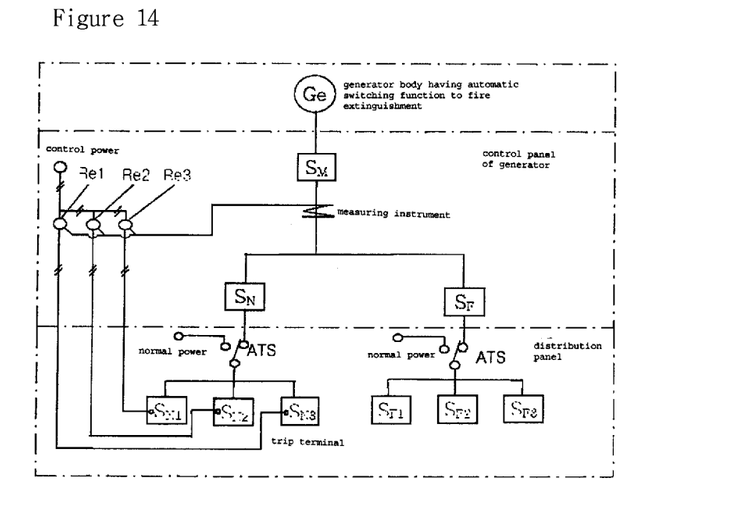

FIG. 14 shows the emergency generator power systems with reserved fire protection power according to still another preferred embodiment of the present invention, which is almost similar to FIG. 8, but the control instrument constitutes the emergency generator power systems with reserved fire protection power for fire protection systems and other emergencies using various kinds of relays like a plurality of digital relay.

Figure 15:
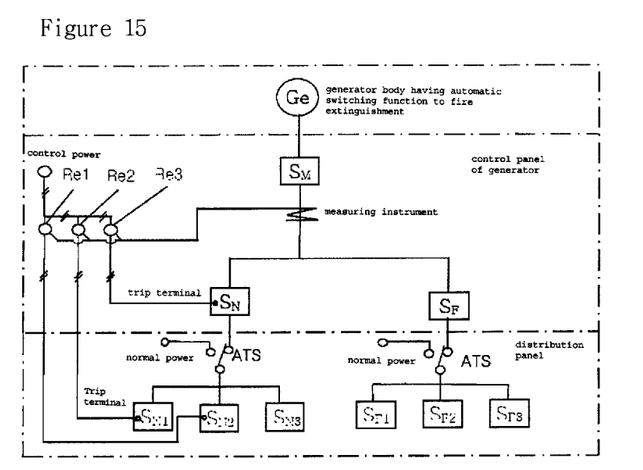

FIG. 15 shows the emergency generator power systems with reserved fire protection power according to still another preferred embodiment of the present invention, which is almost similar to FIG. 9, but the control instrument constitutes the emergency generator power systems with reserved fire protection power for fire protection systems and other emergencies using various kinds of relays like a plurality of digital relay.

Figure 16:
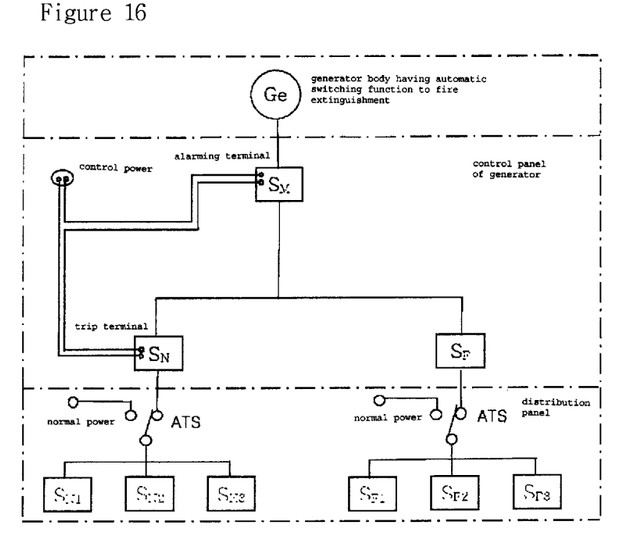

Referring to FIG. 16, there is provided an emergency generator power systems with reserved fire protection power according to still another preferred embodiment of the present invention, which has the same principle and construction as those of FIG. 7, but the generator including: a current transformer CT or a power transformer PT provided on the main power circuit breaker so as to measure over current on the main power line; an over current relay OCR as a control instrument for protection provided on the main power circuit breaker; and a line part receiving the output set from a trip alarming terminal of the over current relay and supplying control power to a trip terminal of the circuit breaker for other emergencies, wherein if the overload is generated on the main power line according to occurrence of fire, the circuit breaker for other emergencies is primarily broken at a previously set overload value, thereby keeping the main power circuit breaker from being broken before the breaking of the circuit breaker for other emergencies. In the preferred embodiment of the present invention, the main power circuit breaker should be manufactured on special specification conditions to allow the alarming terminal to have a sufficient contact capacity, and also, the alarming terminal should have an independent overcurrent operating point different from the operating point of the trip terminal by overcurrent. Alternatively, the main power circuit breaker has a plurality of trip operating outputs used selectively, instead of the alarming terminal, and one of the trip operating outputs should be set lower. This requires special manufacturing process. However, advantageously, only the control line is additionally formed on the outside since the functions of the main power circuit breaker are utilized.

Figure 17:
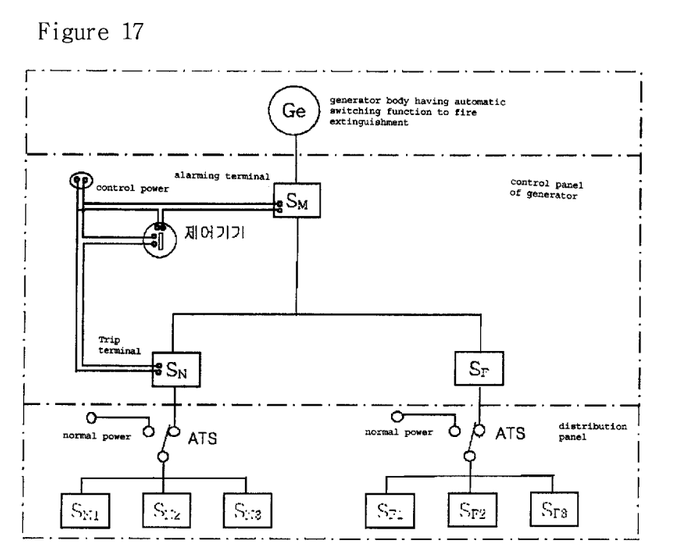

FIG. 17 shows an emergency generator power systems with reserved fire protection power according to yet another preferred embodiment of the present invention, which is almost similar to FIG. 16. In the preferred embodiment of the present invention, advantageously, the circuit breaker for other emergencies is opened by adopting the alarming contact of the main power circuit breaker or one of the output contacts of a separate over current relay, and in this case, if the main power circuit breaker is a standard product, it has a small contact capacity. Thus, an auxiliary control instrument like a relay is additionally installed, thereby improving the safety through the capacity of the added construction.

Figure 18:
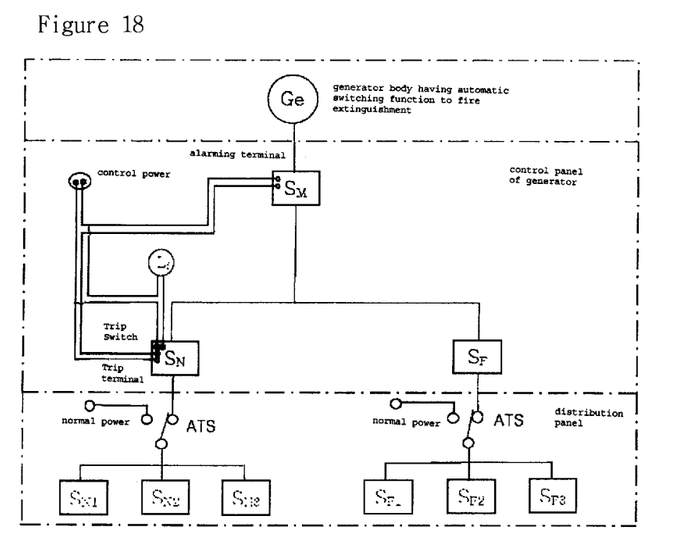

FIG. 18 shows an emergency generator power systems with reserved fire protection power according to yet another preferred embodiment of the present invention, which is almost similar to FIG. 16. In the preferred embodiment of the present invention, advantageously, when the emergency generator power systems with reserved fire protection power for fire protection systems and other emergencies is operated, a lamp is installed to display the operating state, that is, to display the breaking state of the circuit breaker for other emergencies, thereby enhancing the conveniences in use and maintenance thereof. The displaying is formed of symbols, characters or patterns on a screen or display window of a digital device or a controller, and alternatively, the lamp on which the characters are displayed is installed, thereby easily recognizing the operating state of the generator to allow the control and manipulation to be easily achieved. Selectively, the memories are stored as events and used to check the history of the generator at the time of after-searching. However, the alarming terminal should be manufactured having special specifications wherein it has a capacity larger than the contact capacity needed to break the circuit breaker for other emergencies.

Figure 19:
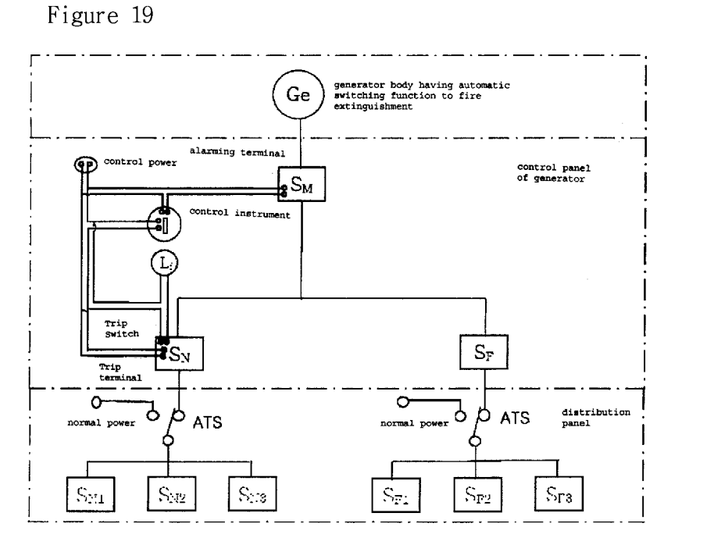

FIG. 19 shows an emergency generator power systems with reserved fire protection power according to yet another preferred embodiment of the present invention, which is almost same as FIG. 18. In the preferred embodiment of the present invention, advantageously, the main power circuit breaker is adopted with a standard product, and as the auxiliary control instrument for supplementing the capacity, a relay and the like is used to enhance the safety of the construction in the direct control of the alarming contact of the over current relay as the main power circuit breaker.

Figure 20:
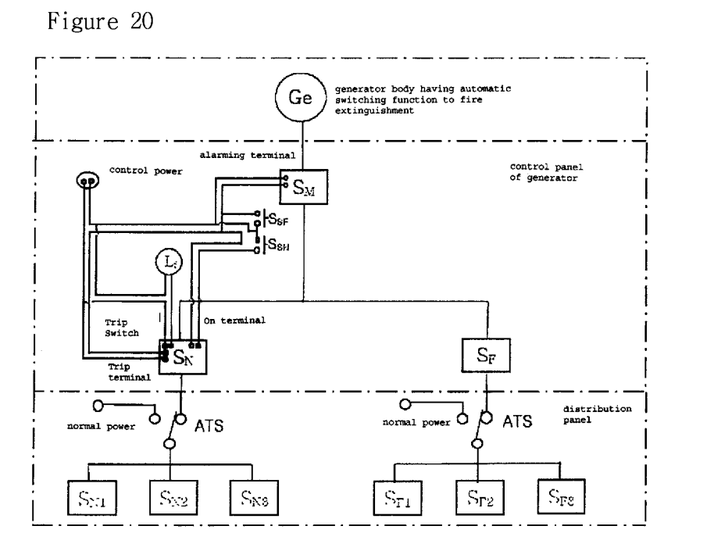

FIG. 20 shows an emergency generator power systems with reserved fire protection power according to still another preferred embodiment of the present invention, which is almost same as FIG. 18, except that control switches are installed to provide functions of testing the switching operation to fire protection and of returning to its original state.

Displaying the operation state of reserve of fire protection power and installing the control switches or both of them are applied selectively to all of the preferred embodiments of the present invention, and their installing positions are determined on the interior or exterior of the control panel. Also, they are monitored and controlled through a CRT installed remotely.

Figure 21:
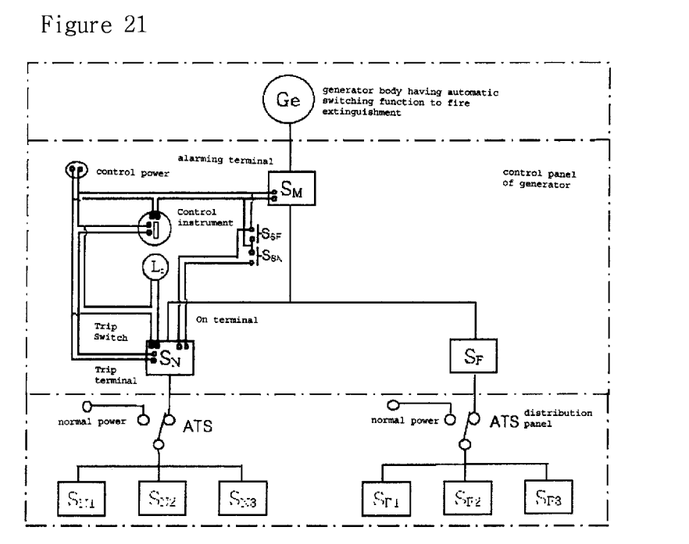

FIG. 21 shows an emergency generator power systems with reserved fire protection power according to yet another preferred embodiment of the present invention, which is almost same as FIG. 20. In the preferred embodiment of the present invention, advantageously, the main power circuit breaker is adopted with a standard product, and as the auxiliary control instrument for supplementing the capacity of the alarming contact of the over current relay of the main power circuit breaker, a relay and the like is used to enhance the safety of the construction.

Figure 22:
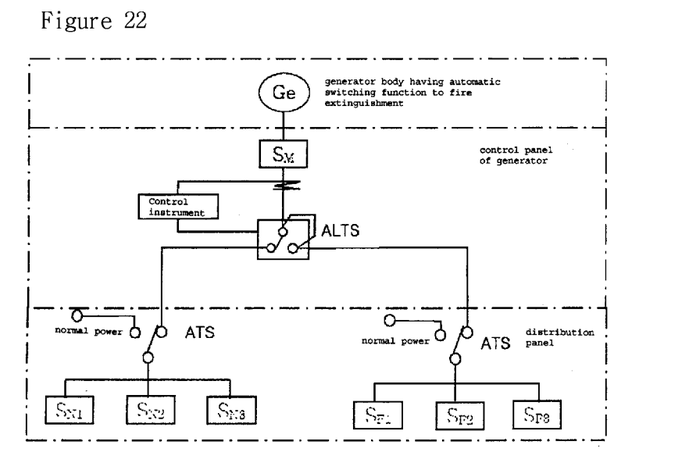

Referring to FIG. 22, there is provided an emergency generator power systems with reserved fire protection power according to yet another preferred embodiment of the present invention, which is similar to FIG. 7, but by applying the automatic load transferring switch or the automatic load circuit breaker as object to be operated, instead of the circuit breaker for other emergencies, the power load for other emergencies is primarily broken, thereby keeping the main power circuit breaker from being broken by the overload of the power load for other emergencies.

The invention claimed is:

1. An emergency generator power system with reserved fire protection power for fire protection systems and other emergencies, the emergency generator power system being used at the time of stop of supplying of normal power and comprising:
   a main power circuit breaker;
   at least one circuit breaker for fire protection systems;
   a circuit breaker for other emergencies branched from the lower end of the main power circuit breaker,
   a measuring instrument adapted to measure power load variations on a main power line to determine whether a fire emergency event occurs;
   a control instrument connected to the measuring instrument at an input side thereof and connected to the circuit breaker for other emergencies at an output side thereof;
   wherein the circuit breaker for other emergencies is configured to be primarily broken when the value of the measured power load variations reaches a predetermined set value, thereby keeping the main power circuit breaker from being broken before the breaking of the circuit breaker for other emergencies,
   wherein an emergency power is supplied to a power load for fire protection systems and a power load for other emergencies at the same time until the emergency generator power systems reaches an overload state during fire, and finally the supply of the fire protection power is primarily kept, thus the emergency power is continuously supplied to the power load for fire protection systems.

2. The emergency generator power system with reserved fire protection power according to claim 1, further comprising:
   a plurality of circuit breakers for other emergencies; and
   a control instrument comprising one or more components such that when a value of the power load sequentially set in plurality is reached, the plurality of the circuit breakers for other emergencies are sequentially broken respectively, thereby keeping the main power circuit breaker from being broken before the breaking of all of the branch circuit breakers for other emergencies.

3. The emergency generator power system with reserved fire protection power according to claim 1, the control instrument comprising auxiliary control instrument for supplementing the capacity.

4. The emergency generator power system with reserved fire protection power according to claim 1, wherein any one of auto load breaker and auto load transfer switch is applied instead of the circuit breaker for other emergencies.

5. The emergency generator power system with reserved fire protection power according to claim 1, wherein the measuring instrument and the control instrument are applied as devices installed in the main power circuit breaker.

6. The emergency generator power system with reserved fire protection power according to claim 1, further comprising a display device adapted to be connected with the circuit breaker for other emergencies through the control line and receive the control power for displaying the operation state of reserve of fire protection power on a display lamp, a display window, or a screen with one or more of characters, symbols, and patterns at a control panel of the generator or controlled remotely.

7. The emergency generator power system with reserved fire protection power according to claim 1, further comprising a control switch connected to the control instrument and the circuit breaker for other emergencies so as to performing a control test for optionally checking the operation state of reserve of fire protection power and a returning test to an original state.

8. The emergency generator power system with reserved fire protection power according to claim 1, wherein the measuring instrument comprises one of a current transformer (CT) and a power transformer (PT).

9. The emergency generator power system with reserved fire protection power according to claim 1, wherein the control instrument comprises one of a digital integrating power controller, an intelligent communication & measuring device, a digital multi power meter, an intelligent measuring & protection device for feeder, a maximum power load controller, a generator's controller, a programmable logic controller (PLC), a microcomputer (MICOM), a central processing unit (CPU), a personal computer (PC), a direct digital controller (DDC), a distributed control system (DCS), a distributed operated console (DOC), a supervisory control and data acquisition (SCADA), an application specific integrated circuit (ASIC), an application specific instruction processor (ASIP), meter relays, watt meters, watt hour meters, var meters, var hour meters, ammeters, digital relays, inductive relays, thermal relays, overcurrent relay (OCR), overpower relay (OPR), electronic overcurrent relay (EOCR), and control relays.

\* \* \* \* \*